(12) United States Patent
Osaki

(10) Patent No.: US 9,061,654 B2
(45) Date of Patent: Jun. 23, 2015

(54) WEBBING WINDING DEVICE

(75) Inventor: Takahiro Osaki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 872 days.

(21) Appl. No.: 13/216,454

(22) Filed: Aug. 24, 2011

(65) Prior Publication Data
US 2012/0048982 A1 Mar. 1, 2012

(30) Foreign Application Priority Data
Aug. 27, 2010 (JP) ................................ 2010-191301

(51) Int. Cl.
*B65H 75/48* (2006.01)
*B60R 22/44* (2006.01)

(52) U.S. Cl.
CPC ........... *B60R 22/44* (2013.01); *B60R 2022/446* (2013.01)

(58) Field of Classification Search
CPC ............ B60R 22/44; B60R 2022/4453; B60R 2022/446; F16D 41/206
USPC ........ 242/375.1, 375; 280/807; 297/475–458; 192/41 S
See application file for complete search history.

(56) References Cited

U.S. PATENT DOCUMENTS

| 1,300,398 | A | * | 4/1919 | Jaeger | 192/55.5 |
|---|---|---|---|---|---|
| 2,643,749 | A | * | 6/1953 | Greenlee | 192/41 S |
| 2,951,568 | A | * | 9/1960 | Hungerford, Jr. et al. | 192/81 C |
| 3,033,336 | A | * | 5/1962 | Kinsman | 192/41 R |
| 3,217,848 | A | * | 11/1965 | Tout-Kowsky et al. | 192/41 S |
| 3,528,533 | A | * | 9/1970 | Sacchini | 192/41 S |
| 4,303,208 | A | * | 12/1981 | Tanaka | 242/372 |
| 5,064,137 | A | * | 11/1991 | Komatsu | 242/349 |
| 5,482,221 | A | * | 1/1996 | Peterson et al. | 242/285 |
| 6,431,485 | B2 | * | 8/2002 | Mitsuo et al. | 242/372 |
| 2001/0015391 | A1 | * | 8/2001 | Katoh | 242/372 |

FOREIGN PATENT DOCUMENTS

JP 2001-233175 8/2001

* cited by examiner

*Primary Examiner* — Emmanuel M Marcelo
*Assistant Examiner* — Angela Caligiuri
(74) *Attorney, Agent, or Firm* — Roberts Mlotkowski Safran & Cole P.C.

(57) ABSTRACT

A difference in limiting torques of rotation between a spring and a rotary member is increased without increasing a number of coils of the spring. In a webbing winding device, an outer diameter of a clutch wall of a clutch wheel increases from a flange side to a stopping flange side of the clutch wall. When a clutch spring is tightly wound on the clutch wall, the clutch spring is subjected to a movement force toward the stopping flange side. Thus, a winding force of the clutch spring onto the clutch wall is effectively increased. Therefore, a difference in limiting torques of rotation between the clutch spring and the clutch wheel between when the clutch spring is not tightly wound on the clutch wall and when it is wound on the clutch wall is increased, without increasing a number of coils of the spring.

6 Claims, 6 Drawing Sheets

WEBBING WINDING DEVICE

CROSS-REFERENCE TO RELATED APPLICATION

This application claims priority under 35 USC 119 from Japanese Patent Application No. 2010-191301 filed Aug. 27, 2010, the disclosure of which is incorporated by reference herein.

BACKGROUND OF THE INVENTION

1. Field of the Invention

The present invention relates to a webbing winding device that transmits urging force to a spool on which a webbing that is applied to an occupant of a vehicle is wound and unwound.

2. Related Art

In a webbing winding device recited in Japanese Patent Application Laid-Open (JP-A) No. 2001-233175, adapters (a first adapter and a second adapter) are provided between a spool and a spiral coil spring, and torsion coil springs (a first torsion coil spring and a second torsion coil spring) are provided at outer peripheries of the adapters.

When the first torsion coil spring is tightly wound on the outer peripheries of the first adapter and the second adapter, turning between the first torsion coil spring and the first adapter and second adapter is limited (regulated), and a rotational urging force is transmitted from the spiral coil spring to the spool.

Subsequently, when the second torsion coil spring is tightly wound on the outer periphery of the second adapter, turning between the second torsion coil spring and the second adapter is limited (regulated), and the rotational urging force that is transmitted from the spiral coil spring to the spool is reduced.

However, in this webbing winding device, a limiting torque between a torsion coil spring and an adapter when the torsion coil spring is not tightly wound on the adapter needs to be small, while a limiting torque between the torsion coil spring and the adapter when the torsion coil spring is tightly wound on the adapter needs to be large. For the difference between the two limiting torques to be large, a number of coils of the torsion coil spring needs to be large.

Now, if the number of coils of the torsion coil spring is increased, both the torsion coil spring and the adapter are longer, and a space for arrangement of the torsion coil spring and the adapter is larger.

Accordingly, it is desired that the difference between the two limiting torques may be increased without increasing the number of coils of the torsion coil spring.

SUMMARY OF THE INVENTION

In consideration of the above circumstances, an object of the present invention is to provide a webbing winding device that is capable of increasing a difference in limiting torques of rotation between a spring and a rotary member between when the spring is not wound on the rotary member and when the spring is wound on the rotary member, without increasing a number of coils of the spring.

A webbing winding device according to a first aspect includes: a spool that, by being rotated, winds and unwinds a webbing that is applied to an occupant of a vehicle; an urger that is capable of transmitting urging force to the spool; a rotary member that is disposed between the spool and the urger; and a spring formed in a helical shape, that is disposed at the rotary member, rotation of the spring relative to the rotary member being limited due to the spring being wound on the rotary member to control transmission of the urging force from the urger to the spool, and a movement force toward one end side being exerted due to the spring being wound on the rotary member, and a winding force onto the rotary member being larger at the one end side than at the other end side.

A webbing winding device according to a second aspect is the webbing winding device according to the first aspect in which a diameter of a portion of the rotary member that is wound by the spring at the one end side of the spring is larger than a portion of the rotary member that is wound by the spring at the other end side of the spring.

A webbing winding device according to a third aspect is the webbing winding device according to the first aspect or the second aspect in which a helical diameter of the spring in a state in which the spring is not disposed at the rotary member is smaller at the one end side of the spring than at the other end side of the spring.

A webbing winding device according to a fourth aspect is the webbing winding device according to any one of the first to third aspects further including a stopping portion that is disposed at the rotary member and is capable of stopping movement of the spring toward the other end side.

In the webbing winding device of the first aspect, the webbing is wound (taken up) or unwound (pulled out) on the spool by the spool being turned (rotated).

The urger can transmit urging force to the spool, and the rotary member is disposed between the spool and the urger. The spring is made helical and is disposed on the rotary member. Rotation of the spring relative to the rotary member is limited by the spring being tightly wound on the rotary member, and the transmission of urging force from the urger to the spool is controlled.

A movement force toward one end is acted (exerted) on the spring by the spring being tightly wound on the rotary member. The winding force of the spring on the rotary member is larger at the one end side than at the other end side.

Therefore, without increasing the number of coils of the spring, the limiting torque of rotation between the spring and the rotary member when the spring is not tightly wound on the rotary member can be made small and the limiting torque of rotation between the spring and the rotary member when the spring is tightly wound on the rotary member can be made large.

Thus, the difference in limiting torques of rotation between the spring and the rotary member between when the spring is not tightly wound on the rotary member and when the spring is tightly wound on the rotary member can be increased without increasing the number of coils of the spring.

In the webbing winding device of the second aspect, a diameter of a portion of the rotary member that is wound by the spring at the one end side of the spring is larger than a portion of the rotary member that is wound by the spring at the other end side of the spring. Therefore, a structure in which winding force of the spring on the rotary member is larger at the one end side than at the other end side can be simple.

In the webbing winding device of the third aspect, a helical diameter of the spring in a state in which the spring is not disposed at the rotary member is smaller at the one end side of the spring than at the other end side of the spring.
Therefore, a structure in which the winding force of the spring on the rotary member is larger at the one end side than at the other end side may be simple.

In the webbing winding device of the fourth aspect, a stopping portion is disposed at the rotary member and is capable of stopping movement of the spring toward the other end side. Therefore, even if the tight winding of the spring on the rotary member is released and a movement force toward the other end side acts on the spring, the spring can be inhibited from falling off from the rotary member.

BRIEF DESCRIPTION OF THE DRAWINGS

Embodiments of the invention will be described in detail with reference to the following figures, wherein.

DETAILED DESCRIPTION OF THE INVENTION

Structure of Present Exemplary Embodiment

Figure 1:
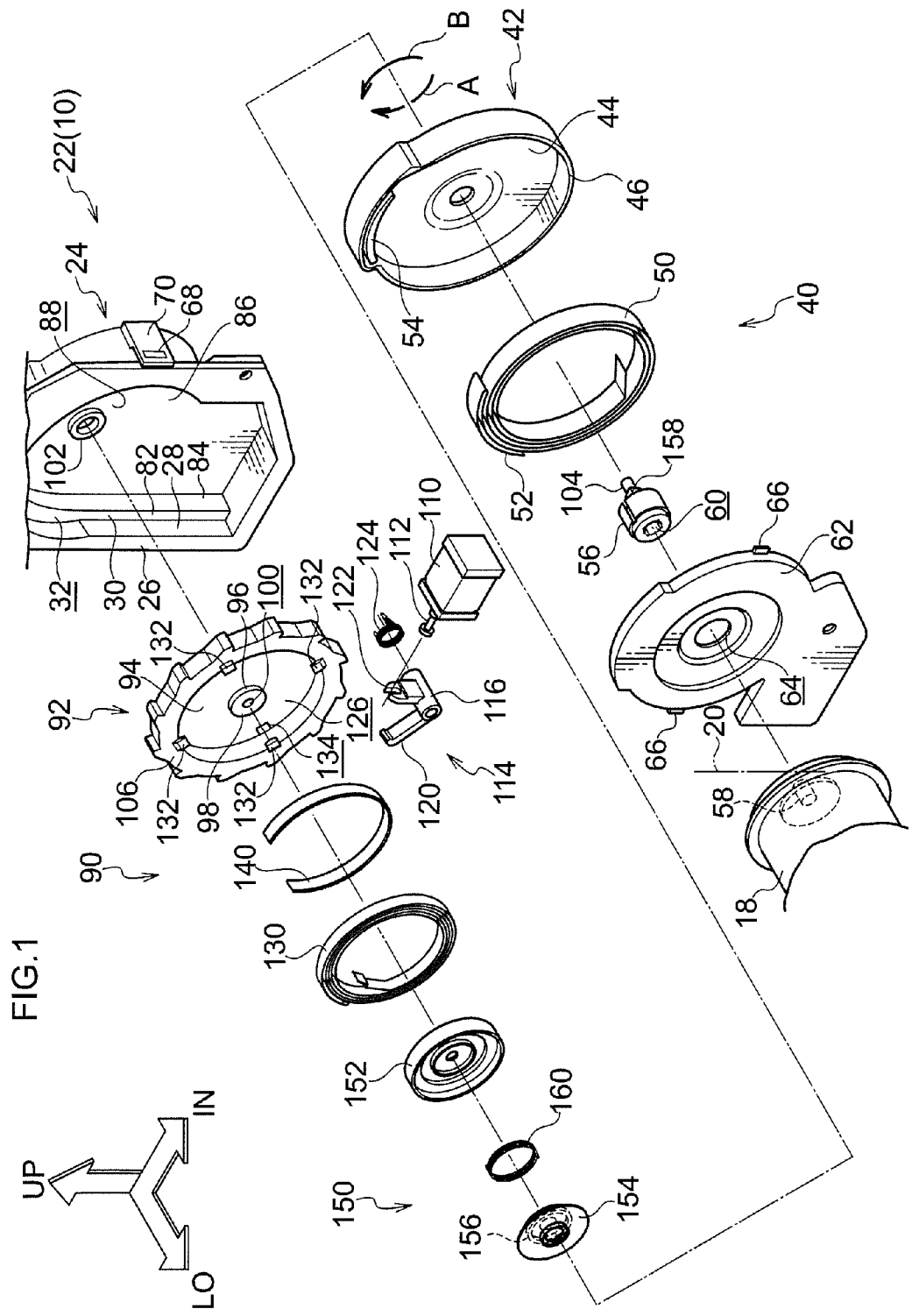
FIG. 1 is an exploded perspective diagram illustrating principal portions of a webbing winding device relating to an exemplary embodiment of the present invention, viewed from one side in a vehicle front-rear direction, from a vehicle width direction inner side.
Figure 2:
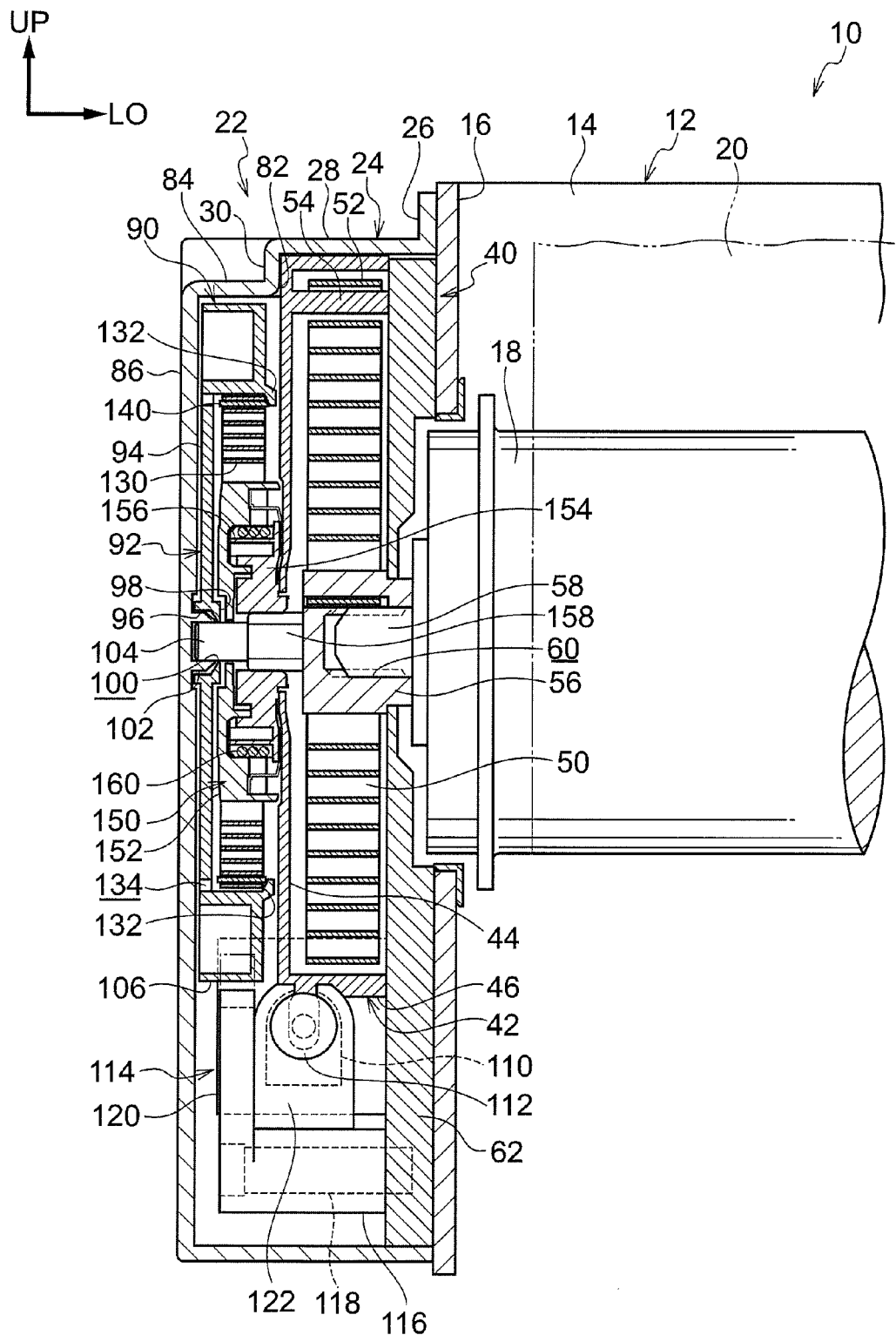
FIG. 2 is a sectional diagram illustrating the principal portions of the webbing winding device relating to the exemplary embodiment of the present invention, viewed from the vehicle width direction outer side.

FIG. 1 shows principal portions of a webbing winding device (a webbing retractor) 10 relating to an exemplary embodiment of the present invention in an exploded perspective diagram viewed from one side in a vehicle front-rear direction and from a vehicle width direction inner side. FIG. 2 illustrates the principal portions of the webbing winding device 10 in a sectional diagram viewed from the vehicle width direction outer side.

As illustrated in FIG. 2, the webbing winding device 10 is provided with a frame 12. The frame 12 is provided with a rear plate 14. A leg plate 16 is extended to one side in a thickness direction of the rear plate 14 from one width direction end portion of the rear plate 14 (a vehicle front-rear direction other side). A leg plate (not illustrated) is extended in the direction of extension of the leg plate 16 from the rear plate 14, from a width direction other end portion of the rear plate 14 (the vehicle front-rear direction one side). A spool 18 is disposed between the leg plate 16 extending from the rear plate 14 width direction one end portion and the (not illustrated) leg plate extending from the rear plate 14 width direction other end portion. As illustrated in FIG. 1, the spool 18 is formed in a circular tube shape whose axial direction is along the width direction of the rear plate 14.

As illustrated in FIG. 1 and FIG. 2, a length direction base end side of a webbing 20 that is formed in a long belt shape is anchored at the spool 18. When the spool 18 turns in a winding (take up) direction (the direction of arrow A in FIG. 1), which is one way about the axis of the spool 18, the webbing 20 is wound up on an outer periphery portion of the spool 18 starting from the length direction base end side thereof. On the other hand, when the webbing 20 is pulled out to a distal end side thereof, the webbing 20 that has been wound on the spool 18 is unwound from the spool 18 and the spool 18 turns in an unwinding (pull out) direction (the direction of arrow B in FIG. 1) that is opposite to the winding direction.

At the other side of the leg plate 16 along the width direction of the rear plate 14, a case 24 that structures a tension reducer 22 is provided. The case 24 is provided with a base portion 26 in a plate shape whose thickness direction is along the thickness direction of the leg plate 16. The base portion 26 is fixed to the leg plate 16 by a fastening fixer such is a screw or the like, and a fitting fixer such as a stud pin or the like. A hole with a predetermined shape is formed in the base portion 26, and an annular periphery wall 28 along the edge of this hole is formed standing to the opposite side of the base portion 26 from the side at which the leg plate 16 is disposed. An intermediate wall 30 is formed continuously from the periphery wall 28 at an end portion of the periphery wall 28 that is at the opposite side thereof from the side at which the base portion 26 is disposed. The intermediate wall 30 is formed in a plate shape whose thickness direction is along the thickness direction of the base portion 26. A space enclosed by the periphery wall 28 at the side thereof that is closer to the base portion 26 than the intermediate wall 30 serves as a winding spring unit accommodation portion 32.

A winding spring unit 40 is disposed inside the winding spring unit accommodation portion 32. The winding spring unit 40 is provided with a spring cover 42 that serves as a retention body. The spring cover 42 is provided with a base wall 44 in a flat plate shape. A periphery wall 46 is provided standing from an outer periphery portion of the base wall 44 toward the leg plate 16. An outer periphery shape of the spring cover 42 is made slightly smaller than an inner periphery shape of the winding spring unit accommodation portion 32 (which is to say, an inner periphery shape of the periphery wall 28), and the spring cover 42 is fitted into the inside of the winding spring unit accommodation portion 32 in a state in which the spring cover 42 is blocked from turning relative to the case 24.

A winding spring 50 that serves as a spool urger is disposed inside the spring cover 42. The winding spring 50 is constituted by a spiral spring in which the direction from the spiral direction outer side to the spiral direction inner side is the unwinding direction. A turned-back portion 52, at which the winding spring 50 is looped back in the opposite direction, is formed at a vicinity of an end portion at the spiral direction outer side of the winding spring 50. An anchoring wall 54 is provided standing from the base wall 44 toward the leg plate 16, and the turned-back portion 52 is anchored by the anchoring wall 54. A spiral direction inner side end portion of the winding spring 50 is anchored at an outer periphery portion of an adapter 56 that structures a transmitter which serves as a linking member.

The adapter 56 is formed in a circular rod shape that is substantially concentric with the spool 18. A fitting hole 60 is formed at an end portion of the adapter 56 that opposes an end portion of the spool 18 at the leg plate 16 side thereof. A linking shaft portion 58, which is formed protruding from the spool 18 concentrically with the spool 18, is fitted into the fitting hole 60. Because the linking shaft portion 58 is fitted into the fitting hole 60, the spool 18 and adapter 56 are connected in a state in which relative rotation of the adapter 56 with respect to the spool 18 is not possible.

Therefore, when the webbing 20 is unwound toward the distal end side thereof and the spool 18 is turned in the unwinding direction, the spiral direction inner side end portion of the winding spring 50 relatively turns in the unwinding direction with respect to the spiral direction outer side end portion. Hence, because the winding spring 50 is tightly wound on the spool 18, the spool 18 is urged in the winding direction, and this urging force increases in accordance with increases in the relative turning amount of the spiral direction inner side end portion of the winding spring 50 in the unwinding direction with respect to the spiral direction outer side end portion.

A seat 62 is disposed at the opening side of the spring cover 42 in which the winding spring 50 is accommodated. The seat 62 has a plate shape whose thickness direction is along the thickness direction of the leg plate 16. A penetrating hole 64 is formed in the seat 62, and the adapter 56 passes therethrough. Fitting pieces 66 are extended from portions of an outer periphery of the seat 62. Fitting portions 70 including fitting holes 68 are formed at the above-described case 24 to correspond with the fitting pieces 66. By the fitting pieces 66 being fitted in the fitting holes 68 of the fitting portions 70, the seat 62 is integrally attached to the case 24, and the opening side of the winding spring unit accommodation portion 32 of the case 24 and the opening side of the spring cover 42 are closed off.

A hole portion 82 with a predetermined shape is formed in the intermediate wall 30 of the case 24. A periphery wall 84 is formed along an edge of the hole portion 82, from a face at the side of the intermediate wall 30 that is opposite from the side thereof at which the leg plate 16 is disposed. An end portion at the opposite side of the periphery wall 84 from the side at which the intermediate wall 30 is disposed is closed off by a floor wall 86. An inner side of the periphery wall 84 at a side thereof that is closer to the intermediate wall 30 than to the floor wall 86 serves as a reducer spring unit accommodation portion 88. A reducer spring unit 90 is accommodated in the reducer spring unit accommodation portion 88. The reducer spring unit 90 is provided with a ratchet gear 92 serving as a rotary body and a spring accommodation portion.

The ratchet gear 92 is provided with a floor wall portion 94 in a plate shape whose thickness direction is along the thickness direction of the floor wall 86. A boss 96 is formed at the middle of the floor wall portion 94. The boss 96 is formed in the shape of a tube with a floor that opens toward the floor wall 86. Relative to an axial direction middle portion of the boss 96, one side thereof (the opening side of the boss 96) protrudes toward the floor wall 86 of the floor wall portion 94. The other side of the boss 96 relative to the axial direction middle portion (a floor portion 98 side of the boss 96) protrudes to the leg plate 16 side of the floor wall portion 94.

The internal shape of the boss 96 is formed as a circle that is concentric with a circle that is the external shape thereof. A penetrating hole 100 that is concentric with the internal shape of the boss 96 is formed in the floor portion 98. While penetrating through the floor portion 98, this penetrating hole 100 is formed in a truncated cone shape with the internal diameter gradually decreasing toward the end that opens in the face at the leg plate 16 side of the floor portion 98.

A bearing portion 102 that constitutes a supporter is formed as a circular tube portion in the floor wall 86 of the case 24 to correspond with the boss 96. The bearing portion 102 is formed in a circular tube shape that is concentric with the spool 18 in a state in which the case 24 is attached to the leg plate 16. A distal end side of the bearing portion 102 may be formed in a truncated cone shape with the external diameter steadily reducing toward the distal end to match the penetrating hole 100 formed in the floor portion 98 of the boss 96. In the state in which the ratchet gear 92 is disposed in the reducer spring unit accommodation portion 88, the bearing portion 102 is inserted inside the boss 96, and the ratchet gear 92 is rotatably supported by the bearing portion 102. A shaft portion 104 is integrally formed at the adapter 56 in a circular rod shape that is concentric with the spool 18. The shaft portion 104 is inserted into the inside of the boss 96 (the penetrating hole 100). The shaft portion 104 is further inserted into the inside of the bearing portion 102. Thus, the shaft portion 104 (that is, the adapter 56) is rotatably supported by the bearing portion 102.

A ring-shaped ratchet portion 106 is formed at an outer periphery portion of the floor wall portion 94. Thus, the ratchet gear 92 is formed overall in a dish shape (the shape of a tube with a floor whose axial direction dimension is relatively short) that opens to the leg plate 16 side. A solenoid 110 is disposed at the radial direction outer side of the ratchet portion 106 (below the ratchet portion 106 in the present exemplary embodiment). The solenoid 110 is electrically connected to a battery installed in the vehicle, via an electronic control unit (ECU) that serves as a controller. This ECU is also electrically connected to a buckle switch provided at a buckle device that structures a seatbelt apparatus together with the webbing winding device 10. When the buckle switch detects that a tongue plate provided at the aforementioned webbing 20 is applied to the buckle device, the ECU electrifies the solenoid 110. When the solenoid 110 is electrified thus, the solenoid 110 forms a magnetic field.

A plunger 112 is provided at the solenoid 110. The plunger 112 is formed in a rod shape of a magnetic material, and a length direction base end side of the plunger 112 is inserted into the solenoid 110. When the solenoid 110 is electrified as described above, the plunger 112 is attracted further into the solenoid 110 by the magnetic field formed by the solenoid 110. A pawl 114 is provided at the distal end side of the plunger 112, and is provided with a circular tube portion 116. The axial direction of the circular tube portion 116 is oriented in the same direction as the axial direction of the spool 18. One or both ends of a shaft portion 118 (see FIG. 2) is/are supported at one or both of the seat 62 and the case 24, the shaft portion 118 passes through the circular tube portion 116, and thus the pawl 114 is supported to be rotatable about the shaft portion 118. A rotation regulation piece 120 is extended from an outer periphery portion of the circular tube portion 116.

Figure 3:
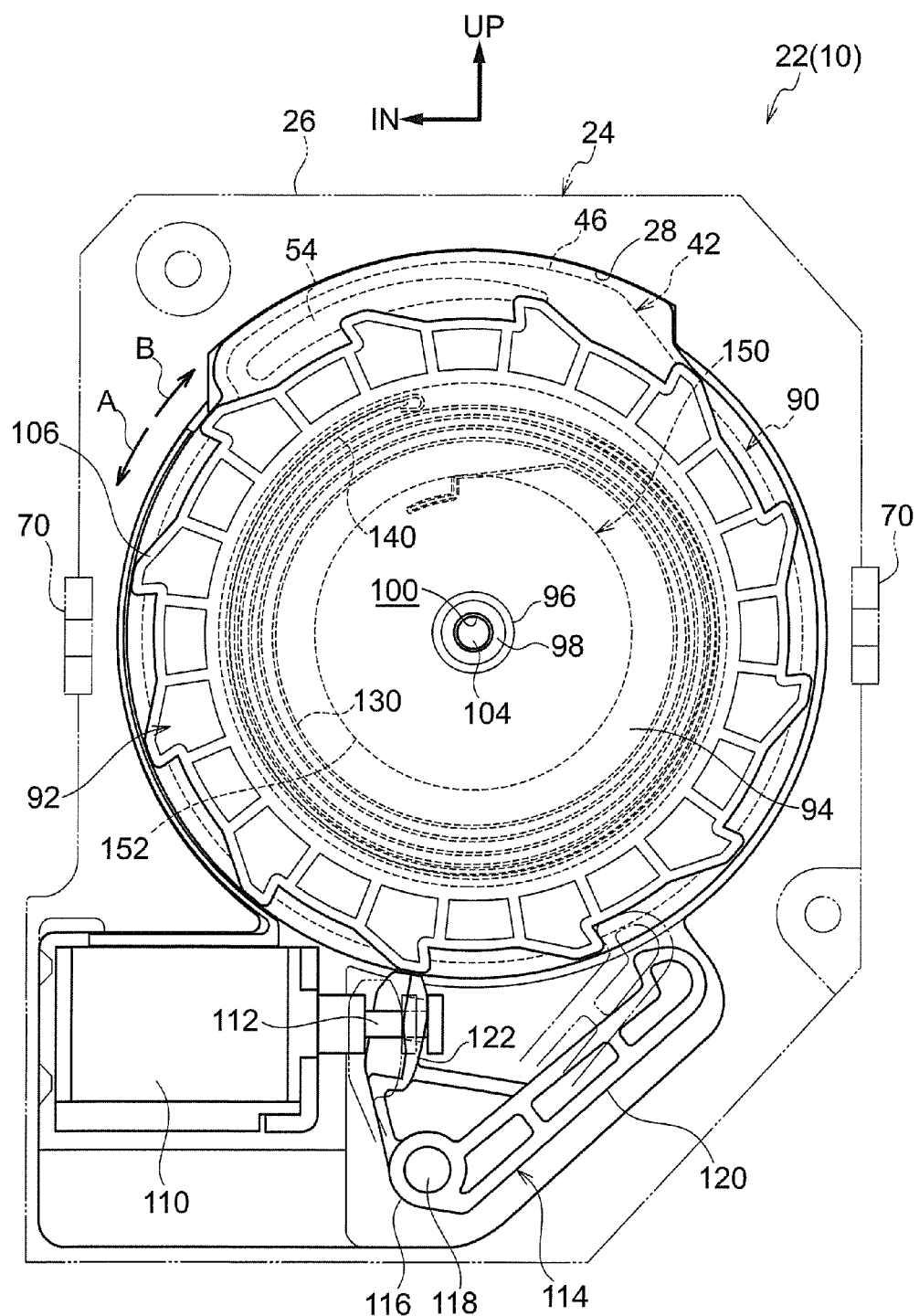
FIG. 3 is a sectional diagram illustrating the principal portions of the webbing winding device relating to the exemplary embodiment of the present invention, viewed from the vehicle front-rear direction other side.

As illustrated in FIG. 3, when the pawl 114 turns in an engaging direction, which is one way about the shaft portion 118, a distal end of the rotation regulation piece 120 approaches the outer periphery portion of the ratchet portion 106 and engages with the ratchet teeth of the ratchet portion 106. In this state in which the distal end of the rotation regulation piece 120 is engaged with the ratchet teeth of the ratchet portion 106, rotation of the ratchet gear 92 in the winding direction is regulated. A linking piece 122 is extended from an outer periphery portion of the circular tube portion 116. The pawl 114 is linked to the plunger 112 by the linking piece 122. When the plunger 112 is attracted into the solenoid 110, the linking piece 122 is pulled by the plunger 112 and the pawl 114 turns in the engaging direction about the shaft portion 118. One end of a return spring 124 (see FIG. 1) is anchored at the pawl 114, and urges the pawl 114 in the direction opposite to the engaging direction. When the solenoid 110 is not electrified, the distal end side of the rotation regulation piece 120 is kept in a state of being separated from the outer periphery portion of the ratchet portion 106.

As illustrated in FIG. 1, the ratchet portion 106 of the ratchet gear 92 is thicker than the floor wall portion 94. Thus, a spring accommodation hole 126 that opens toward the spring cover 42 is formed at the inner side of this ratchet portion 106. A reducer balance spring 130 that serves as an urger structuring the reducer spring unit 90 is disposed at the inner side of the spring accommodation hole 126 (that is, at the inner side of the ratchet portion 106 at the leg plate 16 side of the floor wall portion 94). The reducer balance spring 130 has a weaker urging force than the winding spring 50, and is constituted by a spiral spring with the direction from the spiral direction outer side to the spiral direction inner side being the winding direction.

Interference portions 132 are formed extending from the opening edge of the spring accommodation hole 126 in which the reducer balance spring 130 is accommodated, to the inner side in the radial direction of the opening of the spring accommodation hole 126. Holes 134 are formed in correspondence with the interference portions 132 in the floor wall of the spring accommodation hole 126. The holes 134 are formed to serve as holes through which cores for forming the interference portions 132 pass when the ratchet gear 92 is being assembled. A dimension of protrusion of each interference portion 132 from the opening edge of the spring accommodation hole 126 is set to at least a thickness of the reducer balance spring 130, and a distal end portion of the interference portion 132 reaches further to the opening radial direction inner side of the spring accommodation hole 126 than at least an outermost layer of the reducer balance spring 130.

As illustrated in FIG. 3, in the vicinity of a spiral direction outer side end portion of the reducer balance spring 130, it is bent inward in the radial direction and to the spiral direction inner side. A reducer slide spring 140 is disposed between a portion of the spiral direction outermost layer of the reducer balance spring 130 (a portion at the outermost side of the spiral) and a second portion (layer) from the outermost layer (a second portion (layer) from the spiral outer side). The reducer slide spring 140 is formed, having a narrow width, in a plate shape whose length direction is along the circumferential direction of the reducer balance spring 130 and whose width direction is along the axial direction of the spool 18. The reducer slide spring 140 is curved with the spiral direction inner side end of the reducer balance spring 130 being the center of curvature and the width direction being the axial direction.

Figure 4:
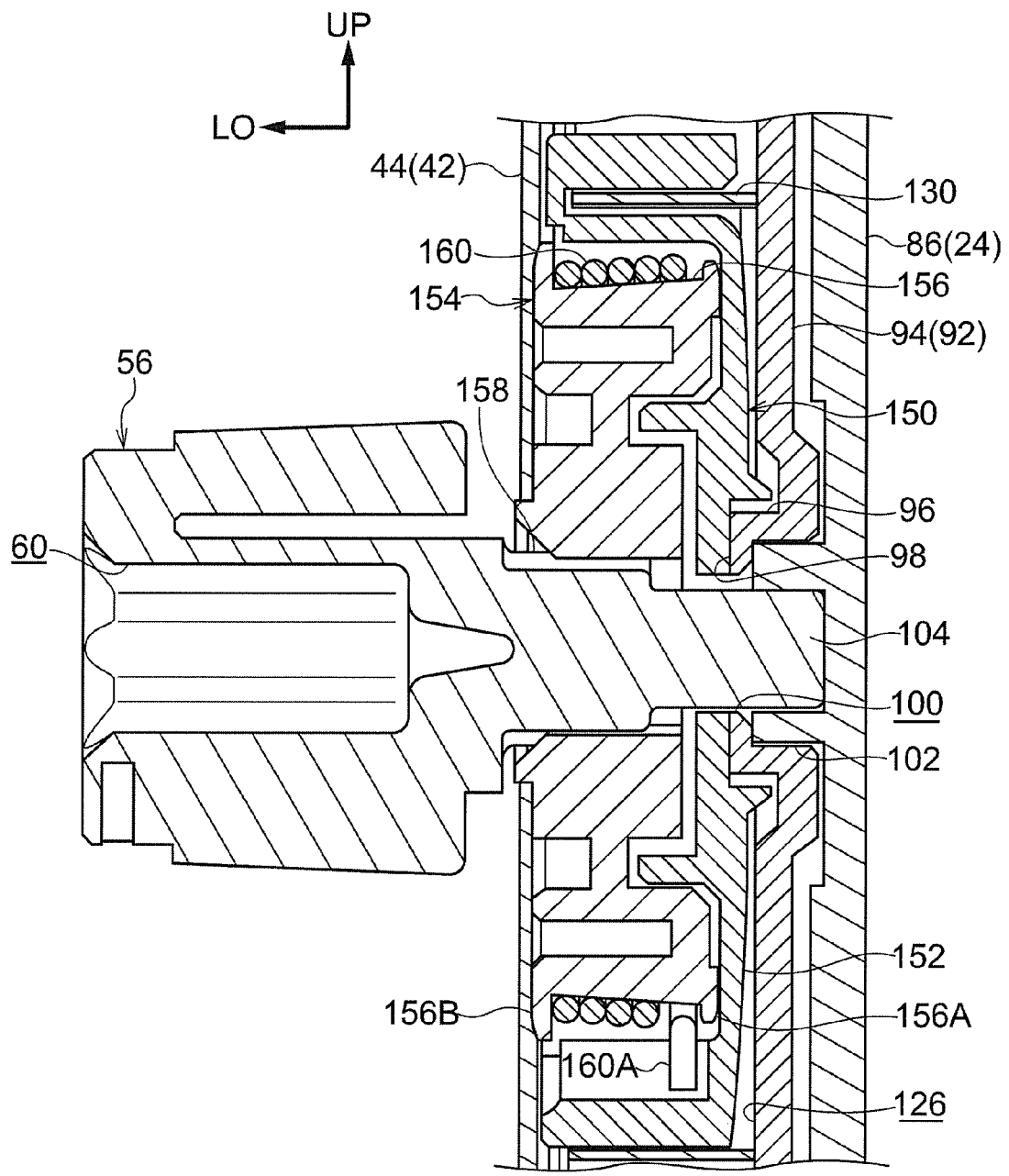
FIG. 4 is a sectional diagram illustrating the principal portions of the webbing winding device relating to the exemplary embodiment of the present invention, viewed from the vehicle width direction inner side.

As illustrated in FIG. 2 to FIG. 4, a clutch 150 that structures the transmitter, which serves as a transmission switcher, is disposed further to the inner side of a portion of the spiral direction innermost layer of the reducer balance spring 130 (an innermost side portion of the spiral).

The clutch 150 is provided with a spring case 152 (a ring) that serves as a transmission member. The spring case 152 is formed in a circular tube shape with a floor, which opens to the leg plate 16 side. The spring case 152 is supported to be concentric with and relatively rotatable with respect to the ratchet gear 92 by the portion of the boss 96 formed at the floor wall portion 94 of the ratchet gear 92 that is disposed at the leg plate 16 side relative to the floor wall portion 94.

The shaft portion 104 of the adapter 56 penetrates through the floor wall of this spring case 152. Thus, the spring case 152 is supported at the boss 96 of the ratchet gear 92 to be concentric with and relatively rotatable with respect to the shaft portion 104. In addition, as illustrated in FIG. 3 and FIG. 4, a spring spiral direction inner side end portion of the reducer balance spring 130 is anchored at the spring case 152.

Figure 5:
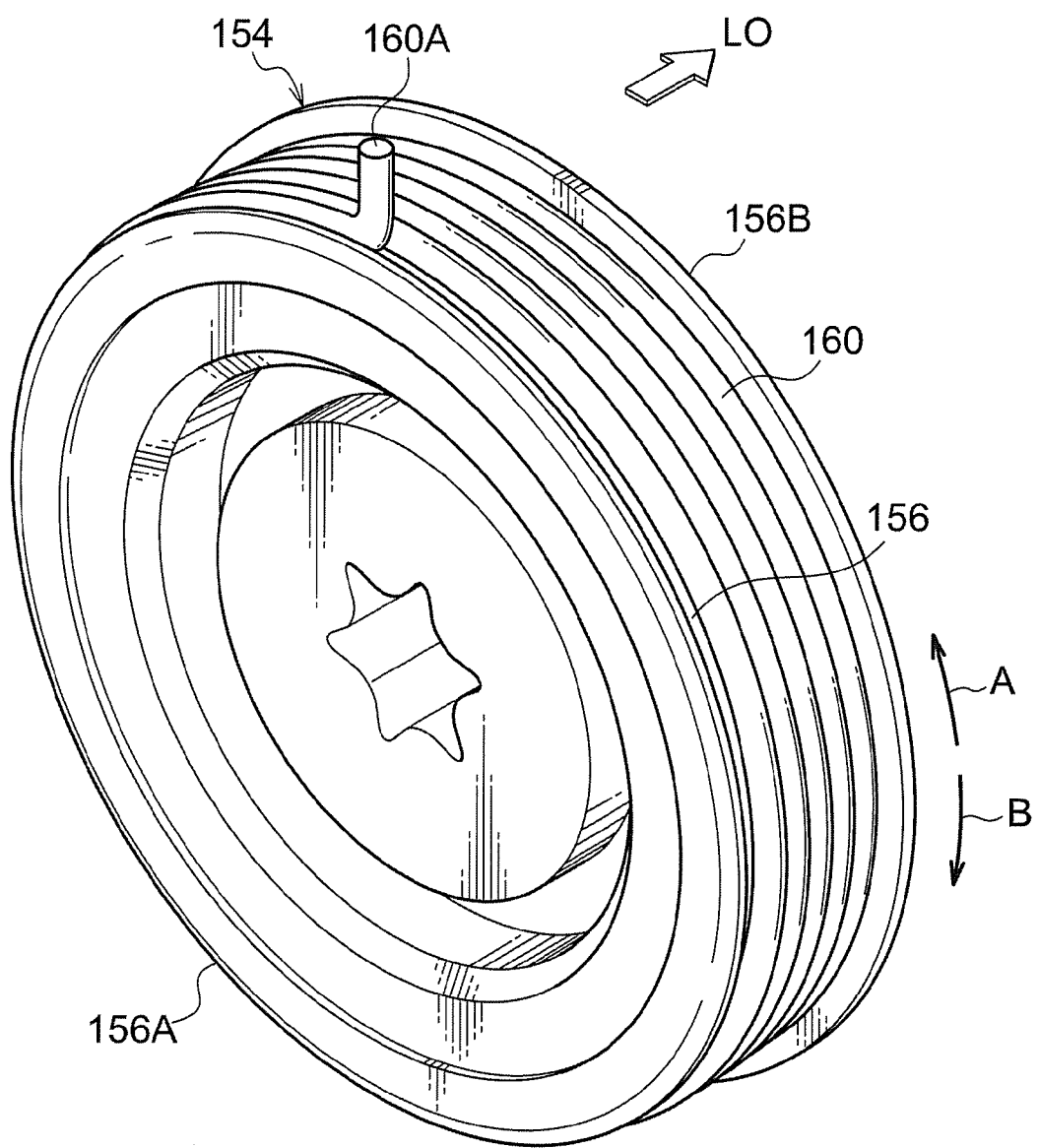
FIG. 5 is a perspective diagram illustrating a clutch wheel and a clutch spring of the webbing winding device relating to the exemplary embodiment of the present invention, viewed from the vehicle front-rear direction other side.

As illustrated in FIG. 4 and FIG. 5, the clutch 150 is also provided with a clutch wheel 154 in a substantially circular shaft shape that serves as a rotary member.

A clutch wall 156 with a substantially circular tube shape that serves as a wound portion is concentrically and integrally formed at the outer periphery portion of the clutch wheel 154.

This clutch wall 156 is inserted into the inside of the spring case 152 in a state of being concentric with the bearing portion 102. The clutch wheel 154 is assembled to the spring case 152 in this state. A detent portion 158 with a non-circular shape is interposed between a main body portion of the adapter 56 and the shaft portion 104. The detent portion 158 concentrically penetrates through the clutch wheel 154, and regulates relative rotation of the clutch wheel 154 with respect to the adapter 56.

An stopping flange 156A with an annular plate shape, which serves as an additional stopping portion, is concentrically and integrally formed at an end portion, which is at the floor wall side of the spring case 152, at the outer side of the outer periphery of the clutch wall 156. The stopping flange 156A protrudes to the radial direction outer side from the outer periphery face of the clutch wall 156.

A flange 156B with an annular plate shape, which serves as an stopping portion, is concentrically and integrally formed at an end portion, which is at a side opposite to the floor wall side of the spring case 152, at the outer side of the outer periphery of the clutch wall 156. The flange 156B protrudes to the radial direction outer side from the outer periphery face of the clutch wall 156.

The outer periphery face of the clutch wall 156 is formed as an inclined face (a taper face) that is inclined, from the flange 156B side thereof toward the stopping flange 156A side, toward the outer side in the radial direction of the clutch wall 156. Thus, from the flange 156B to the stopping flange 156A, the diameter of the outer periphery face of the clutch wall 156 gradually increases.

A clutch spring 160 that serves as a spring is installed and attached at the outer periphery face of the clutch wall 156. The axial direction of the clutch spring 160 is set to the same direction as the axial direction of the spool 18 and the clutch spring 160 is formed in a helical shape (a coil shape) that is wound in a direction from the flange 156B side to the stopping flange 156A side in accordance with the unwinding direction. The stopping flange 156A side of the clutch spring 160 is caughtable at the stopping flange 156A and the flange 156B side of the clutch spring 160 is caughtable at the flange 156B. Thus, the clutch spring 160 is prevented from falling off from the clutch wall 156.

In a natural state of the clutch spring 160 (a state in which the clutch spring 160 is not installed on the outer periphery face of the clutch wall 156), the clutch spring 160 has a constant diameter (helical diameter) over its whole body in the axial direction, and the inner diameter (inner helical diameter) dimension of the clutch spring 160 is smaller than the smallest outer diameter dimension of the clutch wall 156 (the diameter of the outer periphery face of the clutch wall 156 at the flange 156B side end thereof). Therefore, when the clutch spring 160 is installed on the outer periphery face of the clutch wall 156, the clutch spring 160 is increased in diameter against urging force over the whole body thereof in the axial direction, and the clutch spring 160 is pressed against the outer periphery face of the clutch wall 156.

One end 160A of the clutch spring 160, at the stopping flange 156A side, is anchored at the inner periphery face of the spring case 152. Thus, the one end 160A of the clutch spring 160 is regulated rotation in the winding direction and the unwinding direction relative to the spring case 152, and allows movement of the clutch spring 160 in the axial direction relative to the spring case 152.

When the clutch wheel 154 is turned in the winding direction relative to the spring case 152, portions of the clutch spring 160 other than the one end 160A are subjected to frictional force in the winding direction from the outer periphery face of the clutch wall 156, and are turned in the winding direction relative to the one end 160A. Thus, the clutch spring 160 is wound round the outer periphery face of the clutch wall 156. Further, due to that the outer periphery face of the clutch wall 156 is subjected to rotation force in the winding direction with respect to the portions of the clutch spring 160 other than the one end 160A (i.e., the portions of the clutch spring 160 other than the one end 160A are subjected to rotation force in the unwinding direction with respect to the outer periphery face of the clutch wall 156), the clutch spring 160 is subjected to a movement force along the helical direction (the coil direction) with respect to the outer peripheral face of the clutch wall 156, and subjected to a movement force toward the stopping flange 156A side with respect to the outer periphery face of the clutch wall 156.

Since the diameter of the outer periphery face of the clutch wall 156 steadily increases in the direction from the flange 156B side to the stopping flange 156A side as described above, a winding force of the clutch spring 160 onto the outer periphery face of the clutch wall 156 steadily increases toward the one end 160A side from the other end side of the clutch spring 160.

Operation and Effects of the Present Exemplary Embodiment

Next, operation and effects of the present exemplary embodiment are described.

Action of the Tension Reducer 22

In the present webbing winding device 10, when an occupant sitting on a vehicle seat pulls the webbing 20 to the distal end side in order to apply the webbing 20 to their body and the webbing 20 unwinds from the spool 18, the spool 18 turns in the unwinding direction. When the spool 18 turns in the unwinding direction, the adapter 56 turns in the unwinding direction and the spiral direction inner side end portion of the winding spring 50 is turned in the unwinding direction relative to the spiral direction outer side end portion. As a result, the winding spring 50 is tightly wound, and an urging force that urges the spool 18 in the winding direction via the adapter 56 is gradually increased.

The adapter 56 turns in the unwinding direction, so the clutch wheel 154 turns in the unwinding direction. The clutch spring 160 is pressed against the outer periphery face of the clutch wall 156 of the clutch wheel 154. Therefore, when the clutch spring 160 turns in the unwinding direction integrally with the clutch wall 156 due to the frictional force between the outer periphery face of the clutch wall 156 and the clutch spring 160, the spring case 152 to which the one end 160A of the clutch spring 160 is anchored turns in the unwinding direction.

Because the spiral direction inner side end portion of the reducer balance spring 130 is anchored at the spring case 152, when the spring case 152 turns in the unwinding direction, the spiral direction inner side end portion of the reducer balance spring 130 turns in the unwinding direction. The outermost layer of the reducer balance spring 130 is pressed against the ratchet portion 106 of the ratchet gear 92 by elasticity of the reducer balance spring 130 and elasticity of the reducer slide spring 140. Therefore, when the spiral direction inner side end portion of the reducer balance spring 130 turns in the unwinding direction, the outermost layer of the reducer balance spring 130 turns in the unwinding direction, and the ratchet gear 92 turns in the unwinding direction due to friction between the outermost layer of the reducer balance spring 130 and the inner periphery portion of the ratchet portion 106. Thus, in this state, even if a rotation force in the unwinding direction of the spool 18 is transmitted to the ratchet gear 92, only the ratchet gear 92 turns in the unwinding direction, and there is no particular change at the reducer balance spring 130 and the clutch spring 160.

Then, when the webbing 20 is fully pulled out and applied on the body of the occupant, and the tongue provided at the webbing 20 is attached to the buckle device, the ECU electrifies the solenoid 110 in response to an electronic signal from the buckle switch provided at the buckle device. When the plunger 112 is attracted into the solenoid 110 by the magnetic field that is formed by the solenoid 110 being electrified, the pawl 114, which the linking piece 122 is engaged at the distal end side of the plunger 112, turns in the engaging direction against the urging force of the return spring 124. Hence, when the rotation regulation piece 120 of the pawl 114 engages with the ratchet teeth formed at the outer periphery portion of the ratchet portion 106, rotation of the ratchet gear 92 in the winding direction is regulated.

In this state, when the tension force applied to the webbing 20 for unwinding the webbing 20 is released by the occupant (when the occupant stops unwinding the webbing 20), the urging force of the winding spring 50 turns the spool 18 in the winding direction via the adapter 56 and slack in the webbing 20 is taken up. When the clutch wheel 154 is turned in the winding direction relative to the spring case 152 by the adapter 56 being turned in the winding direction, the portions of the clutch spring 160 other than the one end 160A are subjected to frictional force in the winding direction from the outer periphery face of the clutch wall 156, and turned in the winding direction relative to the one end 160A. Thus, the clutch spring 160 is tightly wound on the outer periphery face of the clutch wall 156.

When the frictional force between the clutch spring 160 and the outer periphery face of the clutch wall 156 increases due to that the clutch spring 160 is tightly wound on the outer periphery face of the clutch wall 156, the entire clutch spring 160 turns in the winding direction integrally with the clutch wall 156 (that is, the clutch wheel 154). When the spring case 152 turns in the winding direction due to the clutch spring 160 turning in the winding direction, the spiral direction inner side end portion of the reducer balance spring 130 that is anchored at the spring case 152 turns in the winding direction.

The outermost layer of the reducer balance spring 130 is pressed against the ratchet portion 106 of the reducer spring unit 90 by the elasticity of the reducer balance spring 130 and the elasticity of the reducer slide spring 140, in addition to which rotation of the ratchet gear 92 in the winding direction is regulated as described above. Therefore, even if the spiral direction inner side end portion of the reducer balance spring 130 turns in the winding direction in this state, the outermost layer of the reducer balance spring 130 does not turn, due to the friction with the inner periphery portion of the ratchet portion 106, or a turning amount of the outermost layer of the reducer balance spring 130 is smaller than that of the spiral direction inner side end portion.

The direction from the spiral direction outer side to the spiral direction inner side of the reducer balance spring 130 is set as the winding direction. Therefore, if the spiral direction inner side end portion of the reducer balance spring 130 turns in the winding direction relative to the spiral direction outer side end portion, the reducer balance spring 130 is tightly wound and an urging force (a rotation urging force) urging the spiral direction inner side end portion to turn in the unwinding direction is increased.

The urging force of the reducer balance spring 130 produced (increased) in this manner is a force that urges the spring case 152, to which the spiral direction inner side end portion of the reducer balance spring 130 is anchored, in the winding direction, which is to say, a force against to the urging force of the winding spring 50.

When the reducer balance spring 130 is tightly wound on to be completely in close contact with the outer periphery portion of the spring case 152, the outermost layer of the reducer balance spring 130 and the reducer slide spring 140 are turned integrally by a rotation force in the winding direction that is transmitted to the reducer balance spring 130 via the spring case 152, which is transmitted after this state.

Thus, the urging force of the reducer balance spring 130 is transmitted to the adapter 56 (the spool 18) via the spring case 152, the clutch spring 160 and the clutch wheel 154, and the urging force of the winding spring 50 is partially or wholly counteracted (cancelled) by the urging force of the reducer balance spring 130. Thus, a force acting to turn the spool 18 in the winding direction is reduced, and a force pulling of the webbing 20, toward the base end side of the webbing 20 applied to the body of the occupant, is reduced. Therefore, a clamping (a static clamping force) that the webbing 20 applies to the occupant is moderated.

If the body of the occupant to which the webbing 20 is applied moves, the webbing 20 is pulled out. When the spool 18 turns in the unwinding direction because of the webbing 20 being pulled out, the winding spring 50 is tightly wound, and a force urging the spool 18 in the winding direction, and a force pulling on the webbing 20 and clamping the body of the occupant, increases. However, in the present webbing winding device 10, because the urging force of the reducer balance spring 130 counteracts the urging force of the winding spring 50, an increase in the clamping (a dynamic clamping force) of the webbing 20 when the body of the occupant moves and pulls on the webbing 20 can be suppressed.

When the occupant detaches the tongue from the buckle device, the ECU cancels the electrification of the solenoid 110 in response to an electronic signal from the buckle switch. Hence, when the magnetic field formed in the surroundings of the solenoid 110 is switched off, the pawl 114 is turned in the opposite direction to the engaging direction by the urging force of the return spring 124, and the plunger 112 protrudes from the solenoid 110.

Thus, when the pawl 114 turns in the opposite direction to the engaging direction due to the urging force of the return spring 124, the engagement between the rotation regulation piece 120 of the pawl 114 and the ratchet teeth of the ratchet portion 106 is released. In this state, the rotation of the ratchet gear 92 is not regulated. Thus, due to the urging force of the reducer balance spring 130 that is tightly wound in this state, the ratchet gear 92 is turned and the tight winding of the reducer balance spring 130 is released. In addition, the spring case 152 is turned relative to the clutch wheel 154 and the tight winding of the clutch spring 160 on the outer periphery face of the clutch wall 156 is released (cancelled).

At the clutch wheel 154, the diameter of the outer periphery face of the clutch wall 156 gradually increase, from the flange 156B side to the stopping flange 156A side. As described above, when the clutch spring 160 is tightly wound on the outer periphery face of the clutch wall 156, the outer periphery face of the clutch wall 156 is subjected to a rotation force in the winding direction with respect to portions of the clutch spring 160 other than the one end 160A. Therefore, the clutch spring 160 is subjected to a movement force along the helical direction with respect to the outer periphery face of the clutch wall 156, and subjected to a movement force toward the stopping flange 156A with respect to the outer periphery face of the clutch wall 156.

Therefore, when the clutch spring 160 is tightly wound on the outer periphery face of the clutch wall 156, the movement force toward the stopping flange 156A with respect to the outer periphery face of the clutch wall 156 acts on the clutch spring 160. Thus, the movement force of the clutch spring 160 with respect to the outer periphery face of the clutch wall 156 acts in the direction in which the diameter of the outer periphery face of the clutch wall 156 increases, and a winding force of the clutch spring 160 onto the outer periphery face of the clutch wall 156 is effectively increased.

Thus, without increasing the number of coils of the clutch spring 160, a limiting torque of rotation between the clutch spring 160 and the clutch wheel 154 when the clutch spring 160 is not tightly wound on the outer periphery face of the clutch wall 156 can be small (reduced), while a limiting torque of rotation between the clutch spring 160 and the clutch wheel 154 when the clutch spring 160 is tightly wound on the outer periphery face of the clutch wall 156 can be effectively large (increased).

Therefore, the difference in limiting torques of rotation between the clutch spring 160 and the clutch wheel 154 between when the clutch spring 160 is not tightly wound on the clutch wheel 154 and when the clutch spring 160 is tightly wound on the clutch wheel 154 can be large without increasing the number of coils of the clutch spring 160.

Consequently, both the axial direction length of the clutch spring 160 and the axial direction length of the clutch wall 156 can be shortened, space for arrangement of the clutch spring 160 and the clutch wall 156 can be reduced, and a saving of space may be promoted.

Furthermore, the winding force of the clutch spring 160 onto the outer periphery face of the clutch wall 156 is steadily increased from the other end side toward the one end 160A side just by steadily increasing the diameter of the clutch wall 156 from the flange 156B side toward the stopping flange 156A side. Therefore, a structure in which the winding force of the clutch spring 160 onto the outer periphery face of the clutch wall 156 is larger at the one end 160A side than at the other end side can be simple.

Moreover, movement of the clutch spring 160 toward the stopping flange 156A side is stopped at (by) the stopping flange 156A. Therefore, disengagement of the clutch spring 160 from the clutch wall 156 can be prevented or inhibited.

At the clutch wheel 154, the diameter of the outer periphery face of the clutch wall 156 steadily reduces from the stopping flange 156A side to the flange 156B side. Therefore, as mentioned above, when the tight winding of the clutch spring 160 on the outer periphery face of the clutch wall 156 is released, the clutch spring 160 is reliably moved on the outer periphery face of the clutch wall 156 toward the flange 156B. The movement of the clutch spring 160 toward the flange 156B side is stopped at (by) the flange 156B.

Therefore, disengagement of the clutch spring 160 from the clutch wall 156 when the tight winding of the clutch spring 160 on the outer periphery face of the clutch wall 156 is released can be prevented or inhibited.

Figure 6:
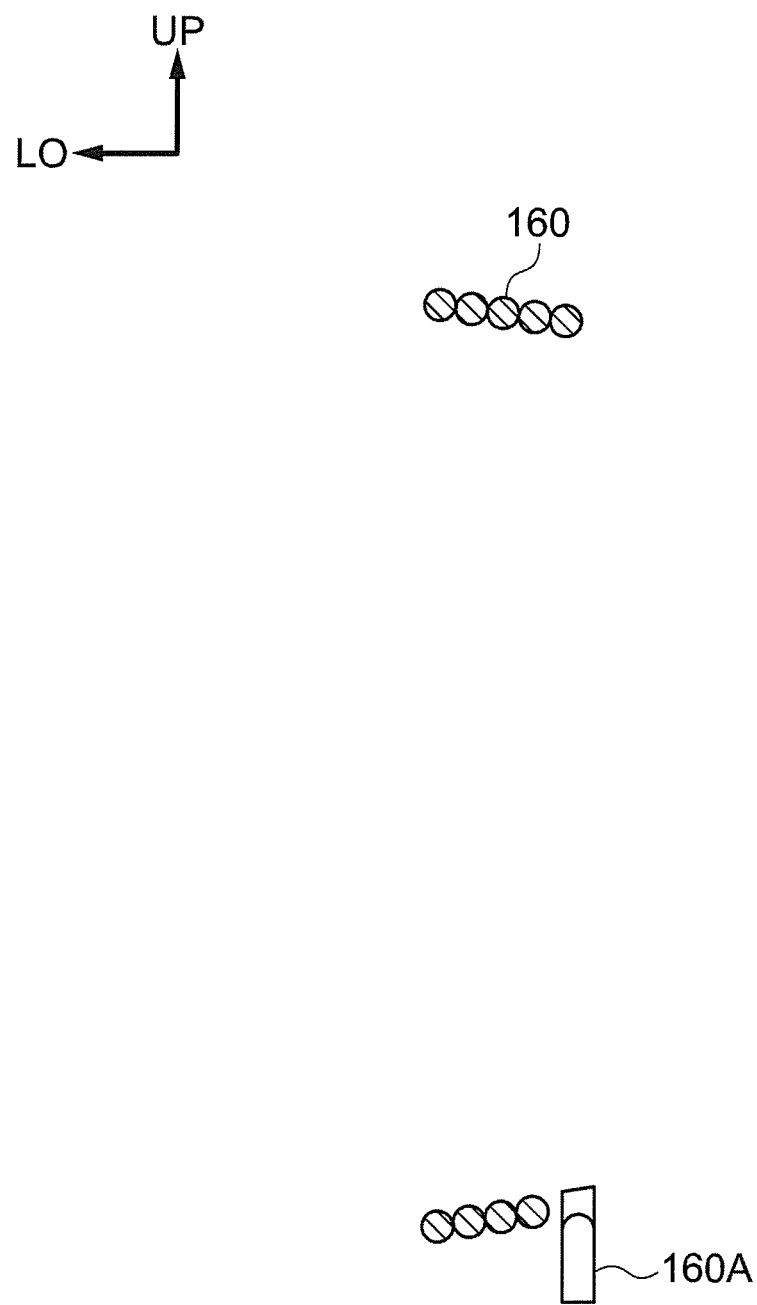
FIG. 6 is a sectional diagram illustrating a clutch spring in a natural state relating to the modified exemplary embodiment of the present invention, viewed from the vehicle width direction inner side.

In the present exemplary embodiment, the outer periphery face of the clutch wall 156 of the clutch wheel 154 steadily increases in diameter from the flange 156B side toward the stopping flange 156A side. However, in addition to or instead of this, the winding force of the clutch spring 160 onto the outer periphery face of the clutch wall 156 may be steadily increased from the other end side toward the one end 160A side by steadily reducing the diameter of the clutch spring 160, in the natural state of the clutch spring 160, from the flange 156B side toward the stopping flange 156A side (FIG. 6).

In the present exemplary embodiment, the urging force of the reducer balance spring 130 is transmitted to the spool 18 by the clutch spring 160 being tightly wound on the outer periphery face of the clutch wall 156. However, transmission of the urging force of the reducer balance spring 130 to the spool 18 may be restricted (inhibited or blocked) by the clutch spring 160 being tightly wound on the outer periphery face of the clutch wall 156.

What is claimed is:

1. A webbing winding device comprising:
    a spool that, by being rotated, winds in a winding direction and unwinds in an unwinding direction a webbing that is applied to an occupant of a vehicle;
    an urger that is capable of transmitting urging force to the spool;
    a rotary member that is disposed between the spool and the urger, and
    a spring formed in a helical shape, that is disposed at the rotary member, rotation of the spring relative to the rotary member being limited due to the spring being wound on the rotary member to control transmission of the urging force from the urger to the spool, and a movement force toward one end side of the spring being exerted due to the spring being wound on the rotary member, and a winding force onto the rotary member being larger at the one end side of the spring than at an opposite end side of the spring,
    wherein a helical diameter of the spring in a state in which the spring is not disposed at the rotary member is smaller at the one end side of the spring than at the other end side of the spring,
    wherein the one end of the spring is anchored such that the one end of the spring is regulated to relatively rotate in the winding direction and in the unwinding direction, and
    wherein the spring moves axially with respect to the rotary member when the spring is tightly wound around the rotary member.

2. The webbing winding device of claim 1, further comprising a stopping portion that is disposed at the rotary member and is capable of stopping movement of the spring toward the other end side.

3. The webbing winding device of claim 1, wherein the one end of the spring is anchored such that the one end of the spring is allowed to relatively move in an axial direction of the rotary member.

4. A webbing winding device comprising:
    a spool that, by being rotated, winds in a winding direction and unwinds in an unwinding direction a webbing that is applied to an occupant of a vehicle;
    an urger that is capable of transmitting urging force to the spool;
    a rotary member that is disposed between the spool and the urger; and
    a spring formed in a helical shape, that is disposed at the rotary member, rotation of the spring relative to the rotary member being limited due to the spring being wound on the rotary member to control transmission of the urging force from the urger to the spool, and a movement force toward one end side of the spring being exerted due to the spring being wound on the rotary member, and a winding force onto the rotary member being larger at the one end side of the spring than at another end side of the spring,
    wherein a diameter of a portion of the rotary member that is wound by the spring at the one end side of the spring is larger than a portion of the rotary member that is wound by the spring at the another end side of the spring such that the spring moves axially with respect to the increasing diameter rotary member when the spring is tightly wound around the rotary member,
    wherein the one end of the spring is anchored such that the one end of the spring is regulated to relatively rotate in the winding direction and in the unwinding direction, and
    wherein the spring moves axially with respect to the rotary member when the spring is tightly wound around the rotary member.

5. The webbing winding device of claim 4, wherein a helical diameter of the spring in a state in which the spring is not disposed at the rotary member is smaller at the one end side of the spring than at the other end side of the spring.

6. The webbing winding device of claim 4, wherein the one end of the spring is anchored such that the one end of the spring is allowed to relatively move in an axial direction of the rotary member.

* * * * *